US010991241B2

(12) United States Patent
Ivanov et al.

(10) Patent No.: US 10,991,241 B2
(45) Date of Patent: Apr. 27, 2021

(54) DYNAMIC LAYERS FOR NAVIGATION DATABASE SYSTEMS

(71) Applicant: HARMAN BECKER AUTOMOTIVE SYSTEMS GMBH, Karlsbad-Ittersbach (DE)

(72) Inventors: Volodymyr Ivanov, Odelzhausen (DE); Alexey Pryakhin, Munich (DE); Ievgenii Borshch, Munich (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 225 days.

(21) Appl. No.: 15/653,335

(22) Filed: Jul. 18, 2017

(65) Prior Publication Data
US 2018/0023964 A1 Jan. 25, 2018

Related U.S. Application Data

(60) Provisional application No. 62/364,805, filed on Jul. 20, 2016.

(51) Int. Cl.
  *G06G 7/70* (2006.01)
  *G08G 1/01* (2006.01)
  (Continued)

(52) U.S. Cl.
  CPC ......... *G08G 1/0104* (2013.01); *G01C 15/002* (2013.01); *G01C 21/26* (2013.01);
  (Continued)

(58) Field of Classification Search
  CPC ............ G08G 1/0104; G08G 1/09623; G08G 1/0112; G08G 1/093; G08G 1/052;
  (Continued)

(56) References Cited

U.S. PATENT DOCUMENTS 4,796,191 A 1/1989 Honey et al.
6,856,897 B1 2/2005 Phuyal et al.
(Continued)

OTHER PUBLICATIONS

Non-Final Office Action received for U.S. Appl. No. 15/653,326 dated Mar. 21, 2019, 31 pages.
(Continued)

*Primary Examiner* — Masud Ahmed
(74) *Attorney, Agent, or Firm* — Artegis Law Group, LLP (57) ABSTRACT

In one embodiment, a layer application generates navigation-related data based on observations associated with vehicles. In operation, the layer application generates an attribute based on a first observation associated with a vehicle and an observation type. The layer application then compares the attribute to an existing road database to generate a dynamic layer. Subsequently, the layer application causes the dynamic layer to be transmitted to a navigation subsystem. After receiving the dynamic layer, the navigation subsystem performs navigation operation(s) based on the road database and the dynamic layer. Because the layer application may receive and operate on real-time observations, providers of road databases may produce dynamic layers at a frequency that enables navigation applications to continually provide accurate navigation data.

21 Claims, 4 Drawing Sheets

(51) Int. Cl.

| | |
|---|---|
| *G01C 21/30* | (2006.01) |
| *G01C 21/28* | (2006.01) |
| *G01C 21/26* | (2006.01) |
| *G01C 15/00* | (2006.01) |
| *G06T 7/12* | (2017.01) |
| *G06F 16/29* | (2019.01) |
| *G06F 16/28* | (2019.01) |
| *G01S 19/53* | (2010.01) |
| *G06F 8/65* | (2018.01) |
| *G08G 1/0962* | (2006.01) |
| *G01C 21/36* | (2006.01) |
| *G08G 1/052* | (2006.01) |
| *G08G 1/0967* | (2006.01) |
| *G01S 19/51* | (2010.01) |
| *G08G 1/00* | (2006.01) |
| *G01C 21/32* | (2006.01) |
| *G06T 17/05* | (2011.01) |
| *G01C 21/34* | (2006.01) |
| *G06F 9/445* | (2018.01) |
| *G06F 17/10* | (2006.01) |
| *G08G 1/09* | (2006.01) |

(52) U.S. Cl.
CPC ............ *G01C 21/28* (2013.01); *G01C 21/30* (2013.01); *G01C 21/32* (2013.01); *G01C 21/3415* (2013.01); *G01C 21/36* (2013.01); *G01C 21/3697* (2013.01); *G01S 19/51* (2013.01); *G01S 19/53* (2013.01); *G06F 8/65* (2013.01); *G06F 9/44526* (2013.01); *G06F 16/284* (2019.01); *G06F 16/29* (2019.01); *G06F 17/10* (2013.01); *G06T 7/12* (2017.01); *G06T 17/05* (2013.01); *G08G 1/0112* (2013.01); *G08G 1/052* (2013.01); *G08G 1/093* (2013.01); *G08G 1/0967* (2013.01); *G08G 1/09623* (2013.01); *G08G 1/096716* (2013.01); *G08G 1/20* (2013.01)

(58) Field of Classification Search
CPC .. G08G 1/0967; G08G 1/096716; G08G 1/20; G06F 9/44526; G06F 17/10; G06F 16/29; G06F 16/284; G06F 8/65; G01C 21/3415; G01C 21/30; G01C 21/28; G01C 21/26; G01C 15/002; G01C 21/36; G01C 21/3697; G01C 21/32; G01S 19/53; G01S 19/51; G06T 17/05; G06T 7/12
See application file for complete search history.

(56) References Cited

U.S. PATENT DOCUMENTS

| | | | | |
|---|---|---|---|---|
| 7,164,117 B2* | 1/2007 | Breed | ............... | B60R 21/01516 250/208.1 |
| 7,616,781 B2* | 11/2009 | Schofield | ........... | G06K 9/00818 382/104 |
| 8,731,305 B1 | 5/2014 | Mantri | | |
| 9,361,797 B1 | 6/2016 | Chen et al. | | |
| 9,672,734 B1* | 6/2017 | Ratnasingam | ....... | G08G 1/0112 |
| 10,074,270 B2 | 9/2018 | Ivanov et al. | | |
| 10,332,389 B2 | 6/2019 | Ivanov et al. | | |
| 2002/0035432 A1 | 3/2002 | Kubica et al. | | |
| 2003/0023369 A1 | 1/2003 | Takashima | | |
| 2006/0208169 A1* | 9/2006 | Breed | ................... | B60N 2/002 250/221 |
| 2007/0213896 A1 | 9/2007 | Fischer | | |
| 2008/0004789 A1 | 1/2008 | Horvitz et al. | | |
| 2009/0005979 A1 | 1/2009 | Nakao et al. | | |
| 2009/0228204 A1 | 9/2009 | Zavoli et al. | | |
| 2010/0020074 A1 | 1/2010 | Taborowski et al. | | |
| 2010/0057336 A1 | 3/2010 | Levine et al. | | |
| 2010/0082564 A1 | 4/2010 | Fernekes | | |
| 2010/0198503 A1 | 8/2010 | Beckner et al. | | |
| 2010/0211309 A1 | 8/2010 | Sugawara et al. | | |
| 2010/0321489 A1 | 12/2010 | Chen et al. | | |
| 2012/0197839 A1 | 8/2012 | Vervaet et al. | | |
| 2012/0271864 A1 | 10/2012 | Morlock | | |
| 2013/0328924 A1 | 12/2013 | Arikan et al. | | |
| 2014/0058661 A1* | 2/2014 | Choi | ................... | G09B 29/106 701/428 |
| 2014/0306814 A1* | 10/2014 | Ricci | ...................... | H04W 4/21 340/425.5 |
| 2016/0091323 A1* | 3/2016 | MacGougan | ...... | G01C 21/3697 701/400 |
| 2016/0167582 A1* | 6/2016 | Chen | ................... | G06K 9/00798 348/148 |
| 2016/0171893 A1* | 6/2016 | Chen | ................... | G08G 1/167 701/300 |
| 2017/0120803 A1* | 5/2017 | Kentley | ................... | B60N 2/002 |
| 2017/0268896 A1* | 9/2017 | Bai | ...................... | G01C 21/36 |
| 2017/0287233 A1* | 10/2017 | Nix | ...................... | G07C 5/008 |
| 2017/0332198 A1 | 11/2017 | Dannenbring et al. | | |
| 2018/0003512 A1* | 1/2018 | Lynch | ............. | G08G 1/096716 |
| 2018/0023959 A1 | 1/2018 | Ivanov et al. | | |
| 2018/0025029 A1 | 1/2018 | Ivanov et al. | | |
| 2019/0114909 A1 | 4/2019 | Halama et al. | | |

OTHER PUBLICATIONS

Final Office Action received for U.S. Appl. No. 15/653,326 dated Oct. 3, 2019, 34 pages.
Non-Final Office Action received for U.S. Appl. No. 15/653,308 dated Apr. 16, 2019, 34 pages.
Final Office Action received for U.S. Appl. No. 15/653,308 dated Aug. 19, 2019, 45 pages.
Non-Final Office Action received for U.S. Appl. No. 15/653,314 dated Sep. 19, 2018, 15 pages.
Notice of Allowance received for U.S. Appl. No. 15/653,314 dated Feb. 7, 2019, 18 pages.
Notice of Allowance received for U.S. Appl. No. 15/653,321 dated May 7, 2018, 17 pages.
Non-Final Office Action for U.S. Appl. No. 15/653,326, dated Feb. 6, 2020, 25 pages.
Non-Final Office Action received for U.S. Appl. No. 15/653,308, dated Jan. 30, 2020, 23 pages.
Final Office Action received for U.S. Appl. No. 15/653,308, dated Jun. 5, 2020, 23 pages.

\* cited by examiner

DYNAMIC LAYERS FOR NAVIGATION DATABASE SYSTEMS

CROSS-REFERENCE TO RELATED APPLICATIONS

This application claims benefit of the U.S. Provisional Patent Application having Ser. No. 62/364,805 (Attorney Docket Number HRMN0251USL) and filed on Jul. 20, 2016. The subject matter of this related application is hereby incorporated herein by reference.

BACKGROUND

Field of the Various Embodiments

The various embodiments relate generally to navigation subsystems and, more specifically, to dynamic layers for navigation database systems.

Description of the Related Art

Many vehicles include navigation applications that perform navigation-related activities based on satellite navigation devices (e.g., global positioning system devices) and road databases that specify underlying, physical road networks and associated navigation-related data. For example, a road database could include speed limits at different points along each road to enable a navigation subsystem to estimate travel times, etc. However, over time, the physical road networks and the navigation-related data may change. For instance, new roads may be added to support a new housing subdivision. In an effort to increase the accuracy of road databases, some providers of road databases periodically generate new versions of road databases to reflect any changes to the physical road networks and navigation-related data.

In one approach to generating new versions of road databases, providers of road databases rely on raw data providers to perform data collection operations that generate raw road network and navigation-related data. Upon receiving new raw data, providers of road databases execute road database applications that perform processing operations to generate new versions of road databases that reflect the new raw data. Subsequently, providers of road databases deliver the new versions of road databases to vehicle manufacturers for delivery to vehicles.

One limitation of generating new versions of road databases is that both the data collection operations and the road database generation operations are typically time consuming and, consequently, the length of time between new versions of road databases may be undesirably long. For example, a provider of a road database could provide an update every 6 months. While providing a new version of the road database every 6 months may provide the desired accuracy for certain types of relatively static data, providing a new version of the road database every 6 months may not provide the desired accuracy for some types of more dynamic navigation-related data. Examples of relatively dynamic navigation-related data include speed limits, road construction pavement markings, and accident locations, to name a few.

In general, over time, the accuracy of dynamic navigation-related data included in road databases degrades. As a result, navigation applications that rely on the road databases may provide inaccurate navigation information. For example, suppose that a current version of a road database specifies a speed limit for a portion of a road as 80 miles per hour (MPH), and the speed limit is subsequently reduced to 30 MPH. In such a scenario, a navigation application that relies on the road database would provide users with inaccurate information (e.g., estimated travel times) until a new version of the road database is delivered to the associated vehicle.

As the foregoing illustrates, more effective techniques for generating navigation-related data would be useful.

SUMMARY

One embodiment sets forth a method for generating navigation-related data, The method includes generating a first attribute based on a first observation associated with a first vehicle and a first observation type; performing one or more comparison operations between the first attribute and a road database to generate a first dynamic layer; and causing the first dynamic layer to be transmitted to a first navigation system, where the first navigation system performs at least one navigation operation based on the road database and the first dynamic layer.

Further embodiments provide, among other things, a system and a computer-readable medium configured to implement the method set forth above.

At least one advantage of the disclosed techniques is that the disclosed techniques enable providers of road databases to produce and/or distribute dynamic layers more frequently. Consequently, navigation applications can be continually updated in order to provide more accurate navigation data. In particular, the dynamic layer enables navigation applications to provide accurate information when characteristics associated with road segments (e.g., speed limits) change between updates to different versions of a road database.

BRIEF DESCRIPTION OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

Road Database Layer System

Figure 1:
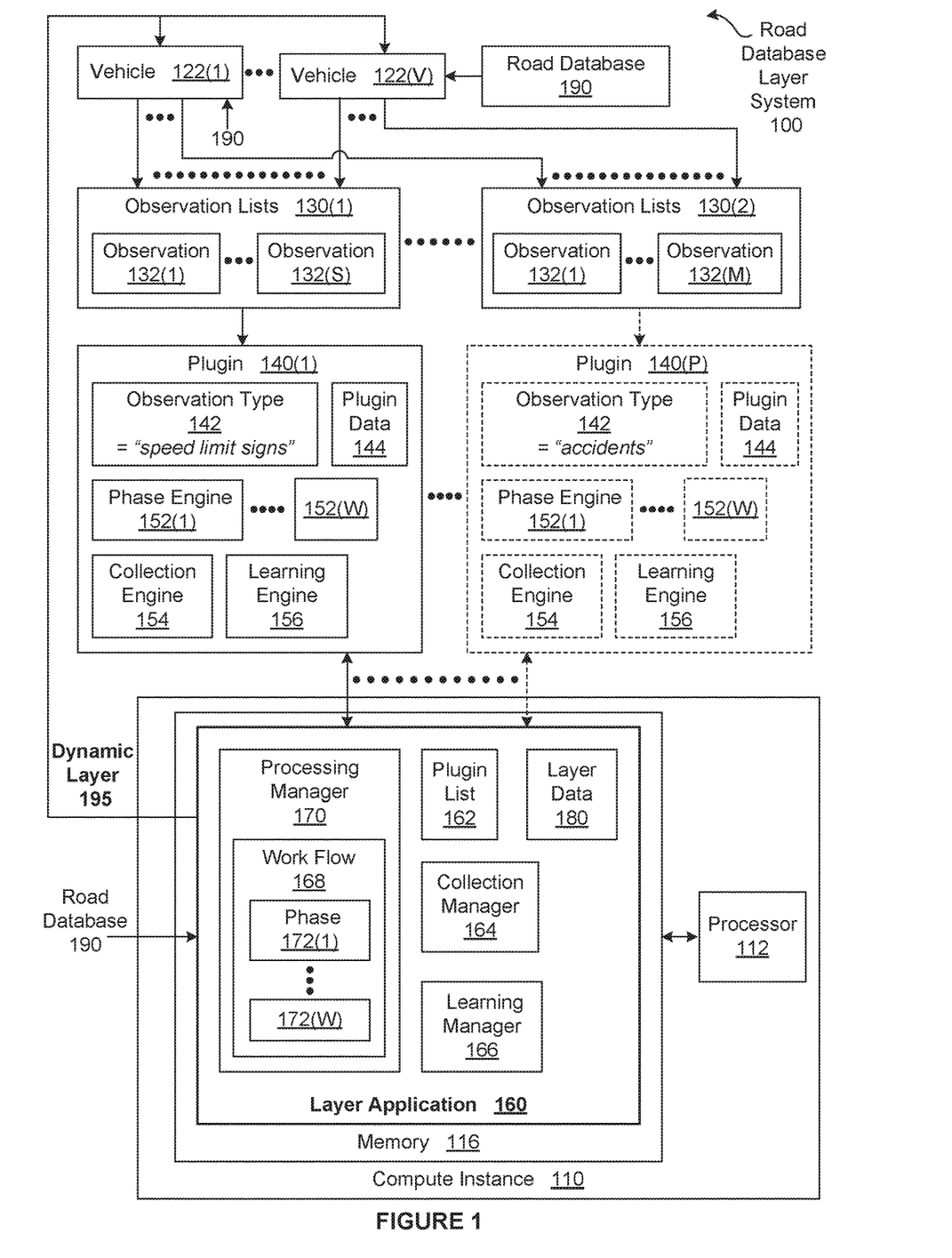
FIG. 1 illustrates a road database update system configured to implement one or more aspects of the various embodiments.

FIG. 1 illustrates a road database layer system 100 configured to implement one or more aspects of the various embodiments. As shown, the road database layer system 100 includes, without limitation, a road database 190, a compute instance 110, plugins 140, and observations lists 130. In alternate embodiments, the road database layer system 100 may include any number of road databases 190, any number of compute instances 110, any number of plugins 140, and any number of observations lists 130. For explanatory purposes, multiple instances of like objects are denoted with reference numbers identifying the object and parenthetical numbers identifying the instance where needed.

In general, the road database layer system 100 receives information from and transmits to any number of vehicles 122. Although not shown in FIG. 1, each of the vehicles 122 includes a navigation application that enables a user to perform navigation-related operations (e.g., viewing maps, generating and viewing directions and travel times, etc.) based the road database 190, sensor data, and as described in detail below, a dynamic layer 195. The road database 190 specifies underlying, physical road networks and associated navigation-related data. The sensor data provides feedback involving the vehicle 122 and the surrounding environment that enables the driver to efficiently and safely operate the vehicle 122. For instance, the navigation application that is included in the vehicle 122(1) enables the driver of the vehicle 122(1) to efficiently navigate the vehicle 122(1) via global positioning system (GPS) data received from a satellite navigation device associated with the vehicle 122(1).

For each vehicle 122, the navigation application and the associated road database 190 are typically stored in memory included in the vehicle 122. In alternate embodiments, each navigation application may access any road database 190 in any technically feasible fashion. For instance, a navigation application included in the vehicle 122(2) may access the road database 190 via the Internet. In alternate embodiments, the road database system 100 may transmit information to any number of additional navigation applications that are associated with any number and types of devices (e.g., bicycles, smartphones, etc.).

Because the physical road networks and the navigation-related data may change over time, some providers of the road databases 190 periodically generate new versions of the road databases 190 that reflect changes to the physical road networks and navigation-related data. In one approach to generating new versions of the road databases 190, providers of the road databases 190 rely on raw data providers to perform data collection operations that generate raw road network and navigation-related data. Upon receiving new raw data, providers of the road databases 190 execute road database applications that perform processing operations to generate new versions of the road databases 190 that reflect the new raw data. Subsequently, providers of the road databases 190 deliver the new versions of the road databases 190 to vehicle manufacturers for delivery to the vehicles 122. The vehicle manufacturers may deliver the new versions of the road databases 190 to the vehicles 122 in any technically feasible fashion.

One limitation of generating new versions of the road databases 190 is that both the data collection operations and the road database generation operations are typically time consuming and, consequently, the length of time between new versions of the road databases 190 may be undesirably long. For example, a provider of a particular road database 190 could provide an update every 6 months. While providing a new version of the road database 190 every 6 months may provide the desired accuracy for certain types of relatively static data, providing a new version of the road database every 6 months may not provide the desired accuracy for some types of more dynamic navigation-related data. Examples of relatively dynamic navigation-related data include speed limits, road construction pavement markings, and accident locations, to name a few.

In general, over time, the accuracy of dynamic navigation-related data included in road databases 190 degrades. As a result, navigation applications that rely on the road databases may provide inaccurate navigation information. For example, suppose that a current version of the road database 190 specifies a speed limit for a portion of a road as 80 miles per hour (MPH) and the speed limit is subsequently reduced to 30 MPH. In such a scenario, a navigation application that relies on the road database would provide users with inaccurate information (e.g., estimated travel times) until a new version of the road database 190 is accessed (e.g., delivered to the vehicle 122).

Generating Dynamic Layers for Road Databases

To increase the accuracy of information provided by navigation applications between versions of the road database 190, the road database layer system 100 includes a layer application 160. As shown, the layer application 160 resides in a memory 116 that is included in the compute instance 110 and executes on a processor 112 that is included in the compute instance 110. In alternate embodiments, the road database layer system 100 may include any number (including zero) of compute instances 110, any number of memories 116, and any number of processors 112 that are implemented in any technically feasible fashion.

In various embodiments, the compute instance 110 may be implemented as a stand-alone chip or as part of a more comprehensive solution that is implemented as an application-specific integrated circuit (ASIC), a system-on-a-chip (SoC), and so forth. Further, the compute instance 110, the memory 116, and the processor 112 may be implemented via any number of physical resources located in any number of physical positions. For example, the layer application 160 could be included in a compute instance 110(2) that is implemented in a cloud computing environment or a distributed computing environment.

The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112. The memory 116 may be one or more of a readily available memory, such as random access memory (RAM), read only memory (ROM), floppy disk, hard disk, or any other form of digital storage, local or remote.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, a Blu-ray Disc, other tangible storage media, or any suitable combination of the foregoing.

In general, the layer application 160 generates the dynamic layer 195 that specifies, without limitation, updated navigation-related data based on sensor data provided by the vehicles 122. Notably, because the vehicles 122 typically gather and transmit the sensor data vehicles 122 as the vehicles 122 travel along the roads (i.e., in "real-time"), the update applicable 160 may generate the dynamic layer 195 in real-time.

More specifically, each of the vehicles 122 may include any number and type of sensors (not shown) that generate sensor data. For example, the sensors may include a satellite navigation device, a camera, an odometer, and wheels sensors, to name a few. The satellite navigation device could provide GPS data that specifies the vehicle position and, based on multiple vehicle positions over time, an overall vehicle heading. The camera could perform pattern recognition operations on images received as the vehicle 122 travels along a road in an attempt to identify road signs. The odometer could provide a current speed of the vehicle 122. The wheel sensors could provide a current vehicle heading.

As the vehicles 122 operate, in addition to providing the sensor data to the associated navigation application, the vehicles 122 are configured to transmit sensor data as observations 132 for storage in the observation lists 130. Each of the observation lists 130 is associated with an observation type 142. For example, the observation list 130(1) could be associated with the observation type 142 of "speed limit signs." The observation types 142 and corresponding observations lists 130 can be defined in any technically feasible fashion and at any level of granularity.

For instance, in some embodiments, the observations 132 may be stored in a single observation list 132. In other embodiments, the observations 132 may be stored in the observations lists 130(1)-130(7) associated with the observation types 142(1)-142(7) of, respectively, road conditions, emergency vehicles, vulnerable zones, accidents, traffic signs/lights, lane connectivity, and location-aware data (e.g., guard rails, lane markings, etc.). In some alternate embodiments, any number (including all) of the observations 132 may transmitted directly to any number of applications.

Each of the observations 132 specifies, without limitation, any number of characteristics associated with an observed object based on the sensor data and a timestamp that specifies the point in time at which the observation 132 was made. Examples of characteristics associated with an observed sign include an estimated position of the vehicle 122, an estimated heading of the vehicle 122, and an estimated type of the observed object, to name a few. For example, the observation 132(1) could specify that, traveling north at a speed of 90 miles per hour, the vehicle 122 identified a speed limit sign specifying 70 miles per hour.

In general, both the sensor capabilities of the vehicles 122 and the number of observation types 130 for which the vehicles 122 gather sensor data increase over time. To support new observations types 130 and new sensor capabilities without perturbing support for existing observations types 130 and sensor capabilities, the layer application 160 includes plugin functionality, and the road database layer system 100 includes any number of the plugins 140. Each of the plugins 140 includes functionality to collect and process observations 132 included in the observation list 130 that is associated with a particular observation type 142. Each of the plugins 140 may be specified in any technically feasible fashion. For example, a given plugin 140 could be written in a programming language or a scripting language.

As is well-known, plugin functionality enables the layer application 160 and the existing plugins 140 to continue operating while new functionality is developed via a new plugin 140. For instance, the plugin 140(1) includes functionality to collect and process observations 132 included in the observation list 130(1) that is associated with the observation type 142 "speed limit signs." As depicted with dotted boxes, while the layer application 160 and the plugin 140(1) operate, the plugin 140(P) is added to the road database layer system 100. The plugin 140(P) includes functionality to collect and process observations 132 included in the observation list 130(1) that is associated with the observation type 142 "accidents."

As shown, the layer application 160 includes, without limitation, layer data 180, a plugin list 162, a collection manager 164, a processing manager 170, and a learning manager 166. The processing manager 170 specifies a work flow 168 that includes, without limitation, any number of phases 172. In a complementary fashion, each of the plugins 140 includes, without limitation, plugin data 144, the observation type 142, a collection engine 154, any number of phase engines 152, and a learning engine 156. In general, any of the collection engine 154, phase engines 152, and learning engine 156 may store/read data to/from the associated plugin data 144. Similarly, any of the collection manager 164, the processing manager 170, and the learning manager 166 may store/read data to/from the layer data 180. Further, the plugins 140 may transmit any amount of data to the layer application 160 for storage as the layer data 180.

In operation, the layer application 160 receives a registration request from a new plugin 140. In response, the layer application 160 modifies the plugin list 162 to specify the new plugin 140. For explanatory purposes only, each of the plugins 140 included in the plugin list 162 is also referred to herein as the "registered" plugin 140. Subsequently, the collection manager 164 activates the collection engine 154 included in the new plugin 140. Upon activation, the collection engine 154 obtains the observations 132 from the associated observation list 130 and performs filtering operations on the observations 132. In general, the collection engine 154 may be configured to collect and filter the observations 132 from any location in any technically feasible fashion.

For instance, in some embodiments, the collection engine 154 is configured via a raw data model that specifies the data format, a URL at which the observations 132 are located (corresponding to the observation list 130), and a data receiving model (e.g., continuous stream, periodic query, etc.). In some embodiments, the collection engine 154 may be configured to collect any number of the observations 132 from a vehicle manufacturer in addition or instead of collecting any number of the observations 132 from the vehicles 122. In alternate embodiments, the collection engine 154 may be configured to collect raw data from a raw data provider instead of or in addition to collecting the observations 132.

In various embodiments, the collection engine 154 may be configured to disregard any of the observations 132 that specify impossible data, such as a negative timestamp. Notably, the collection engine 154 may operate continuously after activation, independently of the layer application 160, other engines included in the plugin 140, and other plugins 140. In this fashion, the collection engine 154 may collect and filter the observations 132 in real-time.

Subsequently, the layer application 160 receives a request to generate the dynamic layer 195. In alternate embodiments, the layer application 160 may generate the dynamic layer 195 based on any number and type of criteria or event. For instance, in some embodiments, the layer application 160 may be configured to generate a new dynamic layer 195 at a frequency (e.g., 1 day, 12 hours, etc.) that is specified via a graphical user interface (GUI). To generate the dynamic layer 195, the processing manager 170 configures each of the plugins 140 specified in the plugin list 162 to execute the work flow 168 based on the collected observations 130.

More precisely, the work flow 168 includes, without limitation, any number of phases 172. For each of the phases 172(i), each of the plugins 140 includes the corresponding phase engine 152(i). Notably, any of the phase engine 152 included in any of the plugins 140 may either implement any type of functionality in any technically feasible fashion or do nothing. As a general matter, however, the work flow 168 represents an overall approach to generating and specifying navigation-related data, and each of the phases 172 represents a specific type of functionality included in the overall approach.

Executing the included phase engines 152 in the sequence specified via the work flow 168 is referred to here as "executing the work flow 168." The processing manager 170 may configure each of the plugins 140 to execute the work flow 168 in any technically feasible fashion. Further, the processing manager 170 may configure the different plugins 140 to execute the work flow 168 sequentially, concurrently, or in any combination thereof. For instance, in some embodiments, the processing manager 170 may configure the plugin 140(2) to execute the work flow 168 after the plugin 140(1) finishes executing the work flow 168. In other embodiments, the processing manager 170 may configure the plugins 140(1) and 140(2) to execute the work flow 168 concurrently. Although not shown in FIG. 1, as part of executing the work flow 168, any number of the phase engines 152 may access the road database 190.

The final phase engine 152(W) transmits the newly generated navigation-related data to the layer application 160. Upon receiving the navigation-related data, the processing manager 170 stores the navigation-related data as part of the layer data 180. After all the plugins 140 specified in the plugin list 162 finish executing the work flow 168, the processing manager 170 generates the dynamic layer 195 based on the layer data 180 and the road database 190. More precisely, the processing manager 170 performs any number of comparison operations to identify any differences between the layer data 180 and the road database 190. The processing manager 170 generates the dynamic layer 195 that specifies the identified differences, and transmits the dynamic layer 195 to the vehicles 122. Notably, the dynamic layer 195 may specify any amount of updates to existing data included in the road database 190 as well as any amount of newly observed data. In various embodiments, the processing manager 170 may implement any amount of filtering functionality as part of generating the road database 190. For instance as detailed in FIG. 2, the processing manager 170 may filter the navigation-related data based on associated confidence factors that estimate a reliability of the navigation-related data.

In alternate embodiments, the processing manager 170 may transmit the dynamic layer 195 to any number and type of applications or entities in any technically feasible fashion. For example, the processing manager 170 could transmit the dynamic layer 195 to a navigation application that is executing on a smartphone. In another example, the processing manager 170 could transmit the dynamic layer 195 to an application that generates a new version of the road database 190. In yet another example, the processing manager 170 could transmit the dynamic layer 195 to a vehicle manufacturer instead of transmitting the dynamic layer 195 directly to the vehicles 122.

In the same or other alternate embodiments, the road database layer system 100 includes any number and versions of the road databases 190. Further, the navigation application included in different vehicles 122 may be associated with different road databases 190. In such embodiments, the processing manager 170 may generate a separate dynamic layer 195 for each type and version of the road databases 190. For each of the vehicles 122, the processing manager 170 may transmit the dynamic layer 195 corresponding to the road database 190 that is associated with the navigation application included in the vehicle 122.

Finally, for each of the plugins 140 specified in the plugin list 162, the learning manager 166 causes each of the learning engines 156 to perform any number and type of learning operations based on ground truth data. Examples of learning operations include, without limitation, temporal mining, spatial mining, and adjusting parameters of probabilistic models, to name a few. Each of the learning engines 156 may implement any number and type of heuristics and adjust algorithms included in any number of the phase engines 152 and the collection engine 154 in any technically feasible fashion to increase the accuracy of the navigation-related data generated by the associated plugin 140. For instance, in some embodiments, each of the plugins 140 defines factors that influence algorithms implemented in the phase engines 152. The learning engine 156 compares the layer data 180 to the ground truth data to identify any inaccuracies. If the learning engine 156 identifies inaccuracies, then the learning engine 156 may adjust any number of the factors in any technically feasible fashion.

It will be appreciated that the road database layer system 100 shown herein is illustrative and that variations and modifications are possible. The number of compute instances 110, the number of road databases 190, the number of vehicles 122, the number of plugins 140 and the connection topology between the various units in road database layer system 100 may be modified as desired. The functionality implemented in each of the plugins 140 may be implemented in a stand-alone fashion or integrated in any other application (e.g., the layer application 160) or device in any technically feasible fashion. Further, the functionality included in the layer application 160 may be divided across any number of applications that are stored and executed via any number of devices that are located in any number of physical positions. For instance, in various embodiments, the layer application 160 and the plugins 140 may be implemented in a cloud computing environment or a distributed computing environment.

Note that the techniques described herein are illustrative rather than restrictive, and may be altered without departing from the broader spirit and scope of the contemplated embodiments. Many modifications and variations on the functionality provided by the layer application 160 and the plugins 140 will be apparent to those of ordinary skill in the art without departing from the scope and spirit of the described embodiments. For example the functionality provided by one or more of the plugins 140 could implemented as part of the layer application 160. In another example, the layer application 160 could supply any amount and type of functionality (e.g., camera output preprocessing functionality) for use by any number of the plugins 140.

Executing a Work Flow to Generate Attributes

Figure 2:
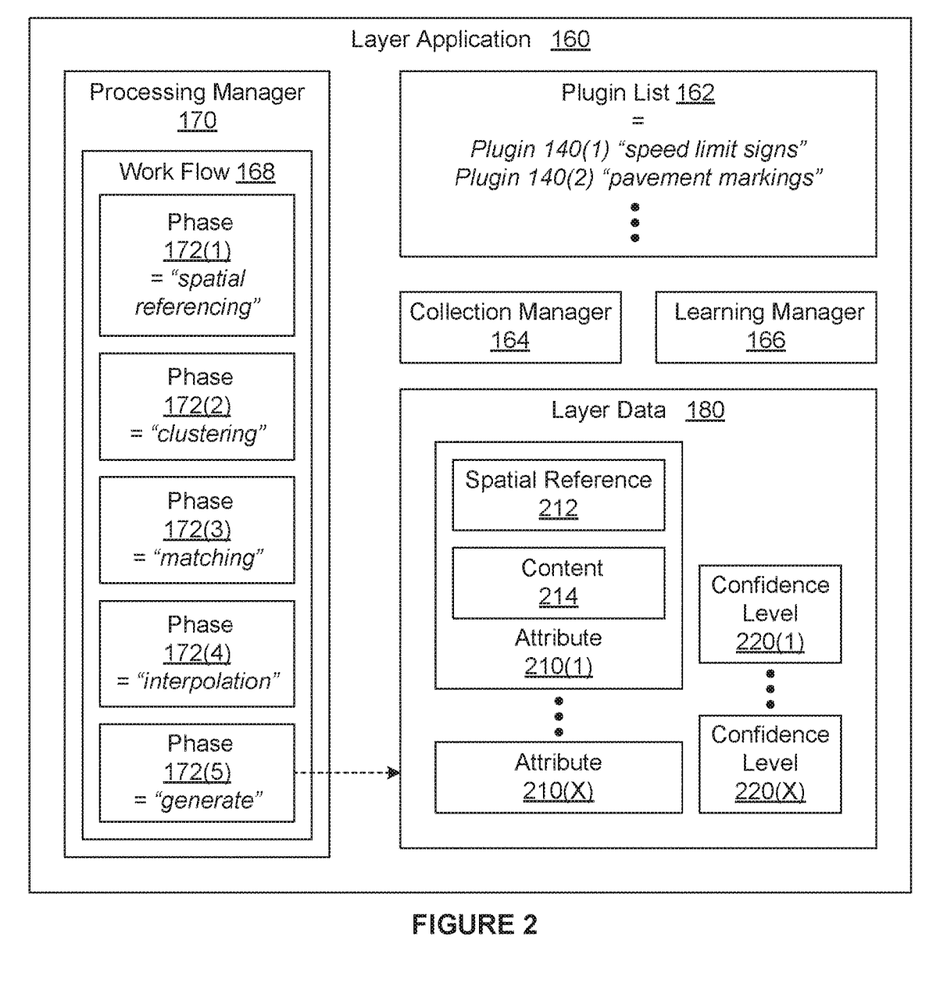
FIG. 2 is a more detailed illustration of the layer application of FIG. 1, according to various embodiments.

FIG. 2 is a more detailed illustration of the layer application 160 of FIG. 1, according to various embodiments. For explanatory purposes only, the layer application 160 of FIG. 1 implements the work flow 168 that represents an overall approach of generating and specifying the layer data 180 that includes any number of attributes 210 and, for each attribute 210, an associated confidence level 220. The work flow 168 includes, without limitation, the phase 172(1) "spatial referencing," the phase 172(2) "clustering," the phase 172(3) "matching," the phase 172(4) "interpolation," and the phase 172(5) "update."

As shown, the attribute 210 includes, without limitation, a spatial reference 212 and content 214. The spatial reference 212 identifies a road segment, and the content 214 specifies data that is related to the road segment or navigation of the road segment. As referred to herein, a road segment refers to any portion of a road between two discrete points. For example, the attribute 210(1) could be associated with a road segment that lies between two intersections and specify a speed limit that is applicable between the two intersections. Each attribute 210 is associated with the confidence level 220 that specifies an estimated reliability associated with the attribute 210.

During the phase 172(1) "spatial referencing," the phase engines 152(1) included in each of the registered plugins 140 generate the spatial references 212 based on coordinates associated with the observations 130 and the topology and geometry of the underlying physical road network. In general, each of the spatial references 212 specify a road segment independent of the manner in which the road segment is identified within the road database 190. Advantageously, if an attribute 210 specifies a road segment via the spatial reference 212, the attribute 210 does not change unless either the content 214 of the attribute 210 changes or the topology and geometry of the underlying physical road network changes. Each of the phase engines 152(1) may implement the phase 172(1) "spatial referencing" in a different fashion or share algorithms that may be implemented in any accessible application (e.g., the layer application 160).

During the phase 172(2) "clustering," the phase engine 152(2) included in each of the registered plugins 140 generate clusters based on the associated observations 130. As part of generating the clusters, the phase engines 152(2) also generate corresponding cluster confidence levels. Each of the clusters specifies one or more characteristics associated with an observed object based on one or more of the observations 130 that are likely of the observed object. Each of the cluster confidence levels estimates an accuracy of the characteristics specified in an associated cluster.

Each of the phase engines 152(2) may include clustering algorithms based on the observation type 142. For example, the phase engine 152(2) included in the plugin 140(1) processes observations 130 associated with the observation type 140 "speed limit signs." Accordingly, the phase engine 152(2) included in the plugin 140(1) processes observations 130 that specify points and generates clusters of points. By contrast, the phase engine 152(2) included in the plugin 140(2) processes observations 130 associated with the observation type 140 "pavement markings." Accordingly, the phase engine 152(2) included in the plugin 140(2) processes observations 130 that specify lines and generates clusters of lines.

During the phase 172(3) "matching," the phase engine 152(3) included in each of the registered plugins 140 matches each of the clusters to a road segment included in the road database 190. As part of performing the matching, the phase engines 152(3) may also generate corresponding matching confidence levels. Each of the phase engines 152(3) matches the clusters to the road segments based on a variety of matching factors. Examples of matching factors include, without limitation, positions, headings, types of road segments (e.g., roundabout, freeway, etc.), and comparisons between the characteristics (e.g., speed limit) associated with the clusters and the types of road segments. For a given cluster, the matching confidence level indicates a likelihood that the observations 130 included in the cluster are of an object that lies along the "matching" road segment.

In some embodiments, the phase engines 152(3) may adjust the matching operations and the matching confidence level based on the cluster confidence levels.

During the phase 172(4) "interpolation," the phase engines 152(4) included in each of the registered plugins 140 perform interpolation operations that may interpolate one or more of the characteristics associated with a matching road segment to an adjacent road segment. As part of performing the interpolation the phase engines 152(4) may also generate corresponding interpolation confidence levels. Each of the phase engines 152(4) may include interpolation algorithms based on the observation type 142. For example, the phase engine 152(4) included in the plugin 140(1) that processes observations 130 associated with the observation type 140 "speed limit signs" may determine whether to interpolate a speed limit based on whether the functional class of two road segments differ. The interpolation confidence level reflects a likelihood that the interpolation is accurate.

Finally, during the phase 172(5) "update," the phase engines 152(5) included in each of the plugins 140 specified in the plugin list 162 generate the attributes 210 and the associated confidence levels 220. In general, for each attribute 210, the phase engine 152(5) sets the spatial reference 212 to the spatial reference 212 initially generated by the phase engine 152(1) and one or more of the characteristics associated with a cluster as the content 214. The phase engines 152(5) then transmit the attributes 210 and the confidence levels 220 to the processing manager 170 for inclusion in the layer data 180. After receiving the attributes 210 and the confidence levels 220 from the plugins 140, the processing manager 170 generates the dynamic layer 195.

To generate the dynamic layer 195, the processing manager 170 performs filtering operations on the attributes 210. More specifically, the processing manager 170 identifies any of the confidence levels 220 that are less than a minimum confidence level as unacceptable. The processing manager 170 then discards any of the attributes 210 that are associated with an unacceptable confidence level 220. The processing manager 170 may determine the minimum confidence level in any technically feasible fashion. For example, the processing manager 170 may receive the minimum confidence level via a GUI. Subsequently, the processing manager 170 compares the remaining attributes 195 included in the layer data 180 to the attributes 195 included in the road database 190 to identify any new or changed attributes 195. The processing manager 170 then copies any identified attributes 180 from the layer data 180 to the dynamic layer 195.

Note that the techniques described herein are illustrative rather than restrictive, and may be altered without departing from the broader spirit and scope of the contemplated embodiments. Many modifications and variations on the functionality provided by the layer application 160 and the plugins 140 will be apparent to those of ordinary skill in the art without departing from the scope and spirit of the described embodiments. For instance, in some embodiments, the layer application 160 may omit the phase 172(2) "clustering," and the plugins 140 may omit the corresponding phase engines 152(2) that implement clustering functionality. In the same or other embodiments, the work flow 168 may include any number of additional phases 172, and each of the plugins 140 may include the corresponding phase engines 152 that either implement additional functionality or do nothing.

Figure 3:
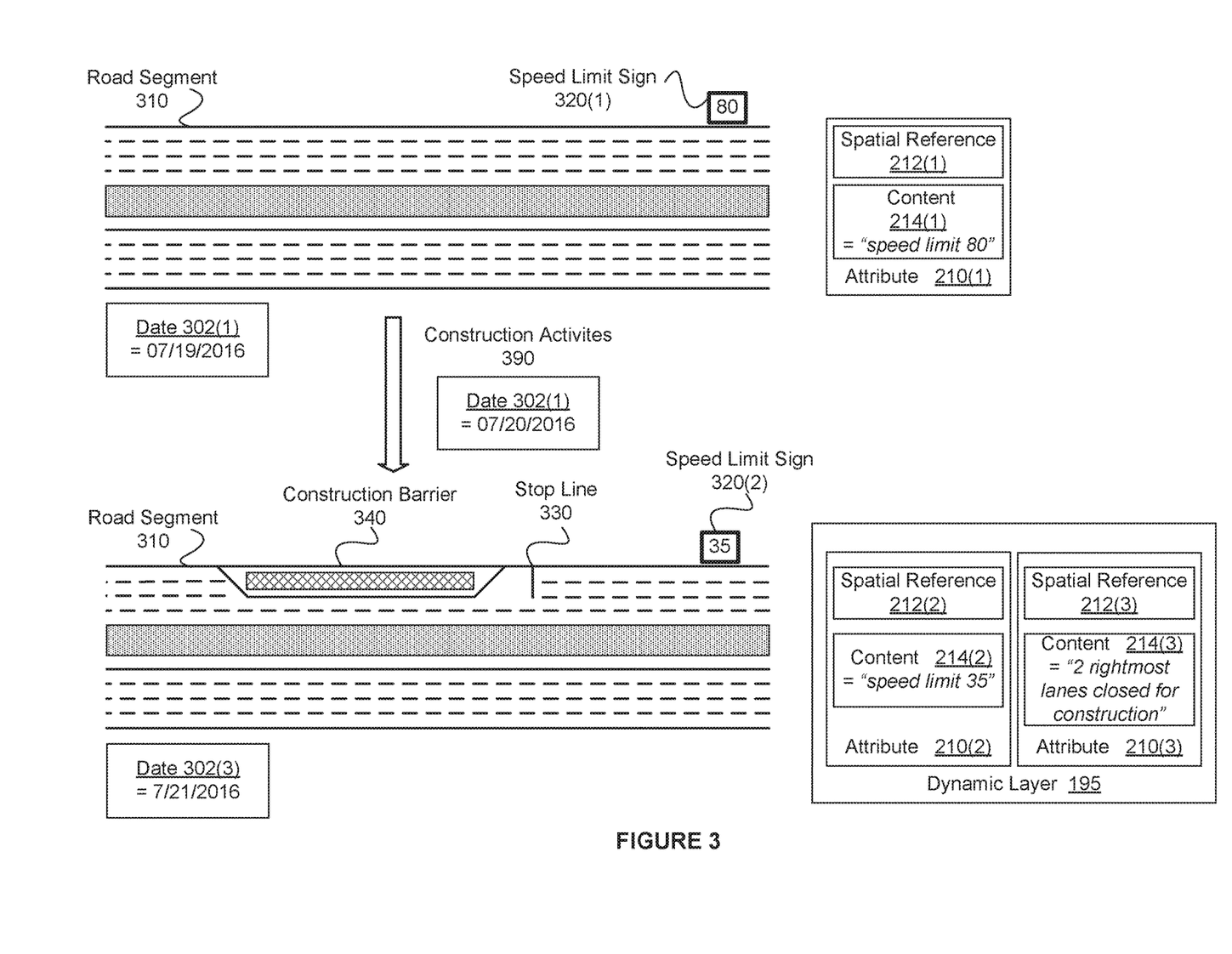
FIG. 3 illustrates an example of the dynamic layer generated by the layer application of FIG. 2, according to the various embodiments.

FIG. 3 illustrates an example of the dynamic layer 195 generated by the layer application 160 of FIG. 2, according to the various embodiments. As shown, a road segment 310 is one side of a portion of a divided freeway and includes four lanes. Further, on the date 302(1) of Jul. 19, 2016, a speed limit sign 320(1) that lies along the road segment 310 specifies 80 MPH For explanatory purposes only, the road database 190 (not shown in FIG. 3) is generated on Jul. 19, 2016. Because the road database 190 is generated on the date 302(1) of Jul. 19, 2016, the road database 190 includes the attribute 210(1) that includes, without limitation, the spatial reference 212(1) indicating the road segment 310 and the content 214(1) indicating a speed limit of 80 MPH. The plugin list 162 includes the two plugins 140(1) and 140(2). The plugin 140(1) receives and processes the real-time observation list 130(1) for the observation type 142 of speed limit signs. The plugin 140(2) receives and processing the real-time observation list 130(2) for the observation type 142 of pavement markings. The layer application 160 is configured to generate a new dynamic layer 195 every two days starting on the date 302(3) of Jul. 21, 2016.

On the date 302(2) of Jul. 20, 2016, a construction crew performs construction activities 390 to create a construction barrier 340 that blocks the two rightmost lanes of the road segment 310. As part of the construction activities 390, the construction crew paints pavement markings that outline the construction barrier 340 and a stop line 330 that indicates where the two rightmost lanes end. Further, the construction crew replaces the speed limit sign 320(1) specifying 80 MPH with the speed limit sign 320(2) specifying 35 MPH.

On the date 302(3) of Jul. 21, 2016, the layer application 160 generates the dynamic layer 195. Based on the observations 132 of the speed limit sign 320(2) that are received from the vehicles 122, the plugin 140(1) provides the layer application 160 with the attribute 210(2). The attribute 210(2) includes, without limitation, the spatial reference 212(2) indicating the road segment 310 and the content 214(2) indicating a speed limit of 35 MPH. Similarly, based on the observations 132 of the pavement markings outlining the construction barrier 320 and the stop line 330 that are received from the vehicles 122, the plugin 140(2) provides the layer application 160 with the attribute 210(3). The attribute 210(3) includes, without limitation, the spatial reference 212(3) indicating the road segment 310 and the content 214(3) indicating that the two rightmost lanes are closed for construction. Because the road database 190 includes neither the attribute 210(2) nor the attribute 210(3), the layer application 160 generates the dynamic layer 195 that includes the attributes 210(2) and 182(3). The layer application 160 then transmits the dynamic layer 195 to navigation applications included in the vehicles 122.

Upon receiving the dynamic layer 195, the navigation applications included in the vehicles 122 perform navigation operations based on both the road database 190 and the dynamic layer 195. In particular the navigation applications may rely on the road database 190 for certain types of relatively static data, such as the underlying road network. The navigation applications may then supplement and/or override more dynamic navigation-related data and/or various types of static data included in the road database 190 with data that is specified via the dynamic layer 195.

For example, suppose that the vehicle 122(1) were to travel along the road segment 310 at a speed of 50 MPH on Jul. 24, 2016. A navigation subsystem included in the vehicle 122(1) could determine that speed of the vehicle 122(1) exceeds the speed limit of 35 MPH specified via the dynamic layer 195. As a result, the navigation subsystem would display a warning to the driver that the speed of the vehicle 122(1) exceeds the speed limit of 35 MPH.

By contrast, suppose that the vehicle 122(1) were to travel along the road segment 310 at a speed of 50 MPH on Jul. 22, 2016, before the speed limit sign 320(1) was replaced with the speed limit sign 320(2). The navigation application included in the vehicle 122(1) could determine that speed of the vehicle 122(1) does not exceeds the speed limit of 80 MPH specified via the road database 190. As a result, the navigation application would not display a warning to the driver that the speed of the vehicle 122(1) exceeds the actual speed limit of 35 MPH.

As illustrated by the above example, because the layer application 160 generates and transmits the new dynamic layer 195 every two days, the length of time that navigation applications included in the vehicles 122 operate based on incorrect speed limits and pavement markings is limited to two days. By contrast, if the navigation applications in the vehicles 122 were not configured to receive the dynamic layers 195, then the navigation applications would operate based on incorrect speed limits and pavement markings until the road database provider generated and distributed a new version of the road database 190.

Figure 4:
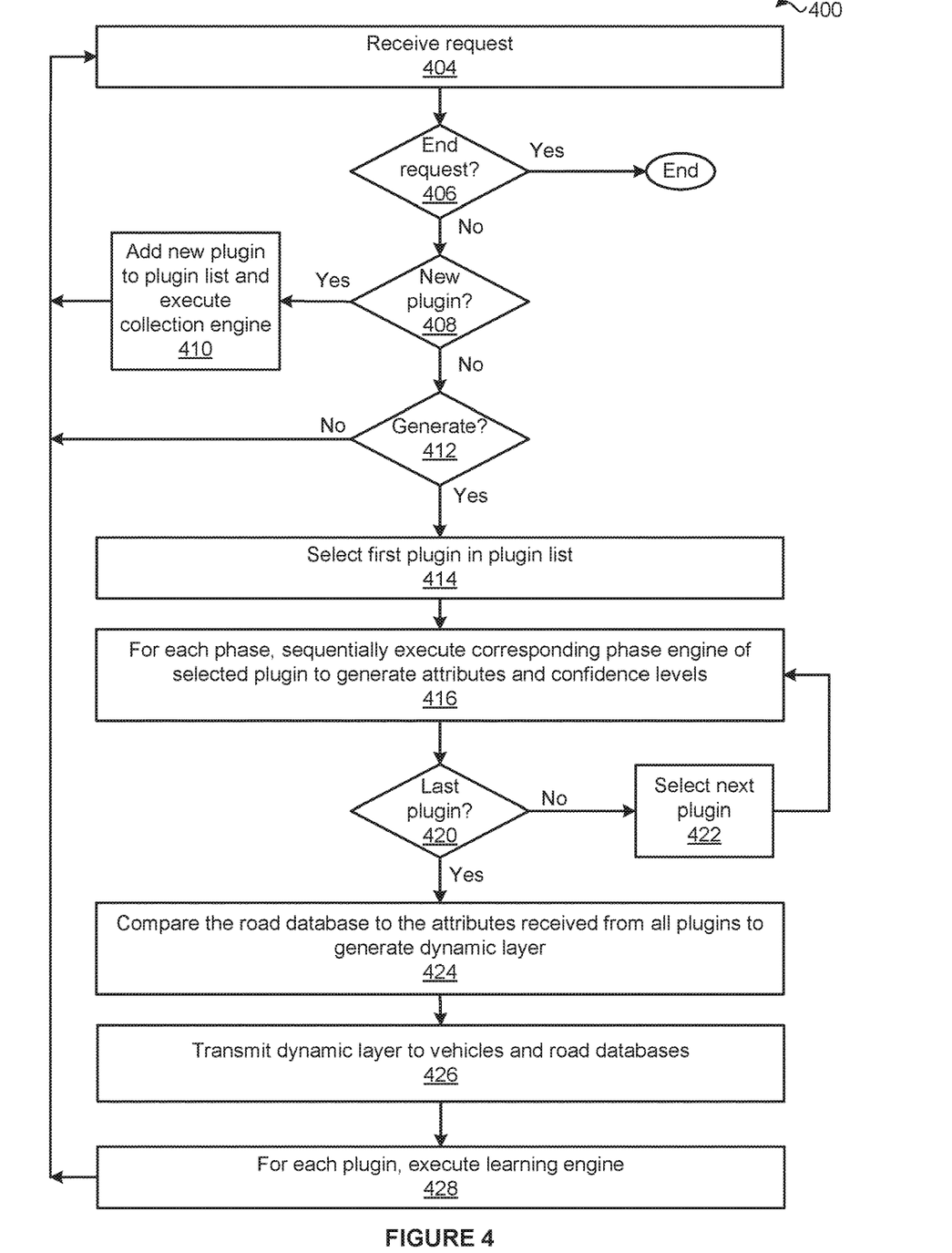
FIG. 4 is a flow diagram of method steps for generating navigation-related data based on observations, according to various embodiments.

FIG. 4 is a flow diagram of method steps for generating navigation-related data based on observations, according to various embodiments. Although the method steps are described in conjunction with the systems of FIGS. 1-3, persons skilled in the art will understand that any system configured to implement the method steps, in any order, falls within the scope of the contemplated embodiments.

As shown, a method 400 begins at step 404, where the layer application 160 receives a request to perform one or more actions. At step 406, the layer application 160 determines whether the received request is a request to terminate the layer application 160. If, at step 406, the layer application 160 determines that the received request is a request to terminate the layer application 160, then the layer application 160 configures each of the plugins 140 included in the plugin list 162 to cease collecting the observations 132 included in the associated observation list 130 and terminate. If, however, at step 406, the layer application 160 determines that the received request is not a request to terminate the layer application 160, then the method 400 proceeds directly to step 408.

At step 408, the layer application 160 determines whether the received request is a request to register a new plugin 140. In alternate embodiments, the layer application 160 may detect a new plugin 140 in any technically feasible fashion instead of based on a request, and the method 400 is modified accordingly. If, at step 408, the layer application 160 determines that the received request is a request to register a new plugin 140, then the method 400 proceeds to step 410. At step 410, the layer application 160 modifies the plugin list 162 to specify the new plugin 140, and the collection manager 160 activates the collection engine 154 included in the new plugin 140. Upon activation, the collection engine 154 starts collecting and filtering the observations 132 included in the associated observation list 130. The collection engine 154 may collect and filter the observation data 132 in any technically feasible fashion. The method 400 then returns to step 404, where the layer application 160 receives a new request.

If, however, at step 408, the layer application 160 determines that the received request is not a request to register a new plugin 140, then the method 400 proceeds directly to step 412. At step 412, the layer application 160 determines whether the received request is a request to generate a new dynamic layer 195. In alternate embodiments, the layer application 160 may determine when to generate a new dynamic layer 195 in any technically feasible fashion (e.g., periodically based on a configurable frequency) instead of based on a request, and the method 400 is modified accordingly. If, at step 412, the layer application 160 determines that the received request is not a request to generate a new dynamic layer 195, then the method 400 returns to step 404, where the layer application 160 receives a new request.

If, however, at step 412, the layer application 160 determines that the received request is a request to generate a new dynamic layer 195, then the method 400 proceeds to step 414. At step 414, the layer application 160 selects the first plugin 140 specified in the plugin list 162. At step 416, for each of the phases 172, the processing manager 170 sequentially executes the corresponding phase engines 152 included in the selected plugin 140 as per the work flow 168. Together, the phase engines 152 perform processing operations on the observations 132 collected by the collection engine 154 to generate the attributes 210 and the associated confidence levels 220. As part of performing processing operations, the final phase engine 152 transmits the attributes 210 and the associated confidence levels 220 to the processing manager 170. The processing manager 170 then includes the attributes 210 and the associated confidence levels 220 in the layer data 180.

At step 420, the layer application 160 determines whether the selected plugin 140 is the last plugin 140 specified in the plugin list 162. If, at step 420, the layer application 160 determines that the selected plugin 140 is not the last plugin 140 specified in the plugin list 162, then the method 400 proceeds to step 422. At step 422, the layer application 160 selects the next plugin 140 specified in the plugin list 162, and the method 400 returns to step 416, where the processing manager 170 causes the newly selected plugin 140 to execute the work flow 168.

If, however, at step 420, the layer application 160 determines that the selected plugin 140 is the last plugin 140 specified in the plugin list 162, then the method 400 proceeds directly to step 424. At step 424, the layer application 160 compares the road database 190 to the layer data 180 to generate the dynamic layer 195. Notably the layer data 180 includes the attributes 210 and the associated confidence levels 220 generated by all of the plugins 140 included in the plugin list 162. Consequently, the dynamic layer 195 specifies changes to navigation-related data as observed by the vehicles 122 and analyzed by the plugins 140. In various embodiments, the layer application 160 may generate a different dynamic layer 195 for each of any number of types and versions of road databases 190.

The layer application 160 may generate the dynamic layer 195 in any technically feasible fashion and any format that is consistent with the road database 190. For instance, in some embodiments, as part of generating the dynamic layer 195, the layer application 160 may compare each of the confidence levels 220 to a predetermined minimum confidence. If a given confidence level 184 is less than the predetermined minimum confidence, then the layer application 160 may discard the corresponding attribute 210.

At step 426, the layer application 160 transmits the dynamic layer 195 to any number of vehicles 122 in any technically feasible fashion. Notably, the set of vehicles 122 from which the plugins 140 receive observations 132 does not necessarily match the set of vehicles 122 to which the layer application 160 transmits the dynamic layer 195. Further, in alternate embodiments, the layer application 160 may transmit the dynamic layer 195 to a vehicle manufacturer or other entity instead of the vehicles 122. The vehicle manufacture or other entity may then forward the dynamic layer 195 to the vehicles 122. In various embodiments, as part of step 424, the layer application 160 may generate a different dynamic layer 195 for each of any number of types and versions of road databases 190. In such embodiments, as part of step 426, for each road databases 190, the layer application 160 may transmit the corresponding dynamic layer 195 to the vehicles 122 that are associated with the road database 190.

At step 428, for each of the plugins 140 specified in the plugin list 162, the learning manager 166 executes the learning engine 156. The learning engine 156 performs learning operations based on ground truth data and the attributes 210 generated by the selected plugin 140. As a result of the learning operations, the learning engine 156 may update factors included in any number of the collection engine 154 and the phase engines 152. In this fashion, the learning engine 156 continually increases the reliability of the attributes 210. The method 400 then returns to step 404, where the layer application 160 receives a new request.

In sum, the disclosed techniques may be used to generate a dynamic layer for a road database based on real-time observations of objects along roads. a layer application may include, without limitation, a plugin list, a collection manager, a processing manager, and a learning manager. The plugin list specifies one or more plugins that provide collection, processing, and learning functionality for a specific type of observation (e.g., speed limit signs, pavement markings, accidents, etc). In operation, upon detecting a plugin, the update manager adds the plugin to the plugin list, and the collection manager activates a collection engine included in the plugin that receives real-time observations from vehicles traveling along roads.

Upon receiving a request to generate a new dynamic layer, the processing manager executes a processing work flow that includes any number of phases and generates attributes that specify characteristics of road segments and associated confidence levels. More specifically, for each plugin and sequentially for each phase, the processing manager activates a corresponding phase engine included in the plugin. Together, the phase engines included in a plugin generate attributes that specify characteristics of road segments based on real-time observations associated with a particular observation type. For each plugin, the learning manager then activates a learning engine that updates factors implemented in the phase engines based on ground truth data. Subsequently, the layer application compares the newly generated attributes with the attributes included in a road database to generate a dynamic layer for the road database. The layer application then transmits the dynamic layer to vehicles for use with associated navigation applications and the road database.

At least one advantage of the disclosed approach is that because the layer application operates on real-time observations, providers of road databases may produce and/or distribute dynamic layers more frequently. Consequently, navigation applications can be continually updated in order to provide more accurate navigation data. Further, since the size of a dynamic layer is significantly smaller than the size of a corresponding road database, the resources required to store and transmit the dynamic layer are reduced compared to the resources that would be required to store and transmit a new version of the road database. Another advantage of the disclosed approach is that the plugin functionality enables users to add support for new observation types without perturbing the collection, processing, and learning operations for existing observations types.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for generating navigation-related data, the method comprising:
    storing a plurality of attributes to a layer data, each attribute being based on an observation associated with a vehicle, wherein the plurality of attributes includes a first attribute based on a first observation associated with a first vehicle and a first observation type, and each attribute in the plurality of attributes has an associated confidence level;
    removing all stored attributes from the layer data having an associated confidence level that does not satisfy a threshold confidence level;
    performing one or more comparison operations between the stored attributes remaining in the layer data after removing all the stored attributes from the layer data having an associated confidence level that does not satisfy the threshold confidence; and
    causing the first dynamic layer to be transmitted to a first navigation system, wherein the first navigation system performs at least one navigation operation based on the road database and the first dynamic layer.

2. The method of claim 1, wherein the first observation type comprises one of road signs, traffic lights, pavement markings, emergency vehicles, or road conditions.

3. The method of claim 1, wherein the first attribute associates first navigation-related data associated with the first observation with a first road segment included in the road database.

4. The method of claim 1, further comprising, prior to performing the one or more comparison operations, generating a first confidence level associated with the first attribute, and determining that the first confidence level indicates that a reliability of the first attribute is greater than a minimum acceptable confidence level.

5. The method of claim 1, further comprising generating the first attribute by causing a first plugin associated with the first observation type to execute a first plurality of processing operations based on the first observation, wherein the first plurality of processing operations implement a data processing flow for the first observation type.

6. The method of claim 5, further comprising causing the first plugin to perform one or more learning operations based on ground truth data.

7. The method of claim 5, wherein the data processing flow includes at least one of a spatial referencing phase, a clustering phase, a matching phase, an interpolation phase, or a generate phase.

8. The method of claim 5, further comprising:
  while the first plugin executes a first set of one or more collection operations to receive a second observation associated with the first observation type, identifying a second plugin associated with a second observation type; and
  causing the second plugin to execute a second set of one or more collection operations to receive a third observation associated with the second observation type.

9. The method of claim 8, further comprising:
  causing the first plugin to execute the first plurality of processing operations based on the second observation to generate a second attribute;
  causing the second plugin to execute a second plurality of processing operations based on the third observation to generate a third attribute, wherein the second plurality of processing operations implement the data processing flow for a second observation type;
  performing one or more comparison operations between the second attribute, the third attribute, and the road database to generate a second dynamic layer; and
  causing the second dynamic layer to be transmitted to the first navigation system.

10. The method of claim 1, wherein the first dynamic layer specifies the one or more differences between the layer data and the road database via one or more attributes.

11. One or more non-transitory computer-readable media including instructions that, when executed by a one or more processors, cause the one or more processors to generate navigation-related data by performing the steps of:
  storing a plurality of attributes to a layer data, each attribute being based on an observation associated with a vehicle, wherein the plurality of attributes includes a first attribute based on a first observation associated with a first vehicle and a first observation type, and each attribute in the plurality of attributes has an associated confidence level;
  removing all stored attributes from the layer data having an associated confidence level that does not satisfy a threshold confidence level;
  performing one or more comparison operations between the stored attributes remaining in the layer data after removing all the stored attributes from the layer data having an associated confidence level that does not satisfy the threshold confidence; and
  causing the first dynamic layer to be transmitted to a first navigation system, wherein the first navigation system performs at least one navigation operation based on the road database and the first dynamic layer.

12. The one or more non-transitory computer-readable media of claim 11, wherein the first observation type comprises one of road signs, traffic lights, pavement markings, emergency vehicles, or road conditions.

13. The one or more non-transitory computer-readable media of claim 11, wherein the first attribute associates a speed limit with a first road segment included in the road database.

14. The one or more non-transitory computer-readable media of claim 11, further comprising, prior to performing the one or more comparison operations, determining that a confidence level associated with a second attribute indicates that a reliability of the second attribute is less than a minimum acceptable confidence level and, in response, removing the second attribute.

15. The one or more non-transitory computer-readable media of claim 11, further comprising generating the first attribute by causing a first plugin associated with the first observation type to execute a first plurality of processing operations based on the first observation, wherein the first plurality of processing operations implement a data processing flow for the first observation type.

16. The one or more non-transitory computer-readable media of claim 15, further comprising causing the first plugin to perform one or more learning operations based on ground truth data.

17. The one or more non-transitory computer-readable media of claim 15, wherein the data processing flow includes at least one of a spatial referencing phase, a clustering phase, a matching phase, an interpolation phase, or a generate phase.

18. The one or more non-transitory computer-readable media of claim 15, further comprising:
  while the first plugin executes a first set of one or more collection operations to receive a second observation associated with the first observation type, identifying a second plugin associated with a second observation type; and
  causing the second plugin to execute a second set of one or more collection operations to receive a third observation associated with the second observation type.

19. The one or more non-transitory computer-readable media of claim 11, wherein the first observation is received from the first vehicle or a manufacturer of the first vehicle.

20. A system for generating navigation-related data, the system comprising:
  a memory storing a layer application; and
  a processor coupled to the memory, wherein when executed by the processor, the layer application causes the processor to:
    store a plurality of attributes to a layer data, each attribute being based on an observation associated with a vehicle, wherein the plurality of attributes includes a first attribute based on one or more observations associated with a road specified in a road database, and each attribute in the plurality of attributes has an associated confidence level;
    remove all stored attributes from the layer data having an associated confidence level that does not satisfy a threshold confidence level;
    perform one or more comparison operations between the stored attributes remaining in the layer data after removing all the stored attributes from the layer data having an associated confidence level that does not satisfy the threshold confidence; and
    cause the first dynamic layer to be transmitted to a first navigation system, wherein the first navigation system performs at least one navigation operation based on the road database and the first dynamic layer.

21. The system of claim 20, wherein a first observation included in the one or more observations is received from a first vehicle or a manufacturer of the first vehicle.

* * * * *